(12) United States Patent
Gothe et al.

(10) Patent No.: US 11,986,050 B2
(45) Date of Patent: May 21, 2024

(54) METHOD OF MANUFACTURING A PARTICLE FOAM PART, ESPECIALLY A CUSHIONING ELEMENT FOR SPORTSWEAR OR SPORTING GOODS

(71) Applicant: adidas AG, Herzogenaurach (DE)

(72) Inventors: Bastian Gothe, Erlangen (DE); Max Kurtz, Erlangen (DE); Christoph Dyckmans, Nuremberg (DE); Amir Fathi, Ho Chi Minh (VN); Harald Sommer, Kreuzwertheim (DE); Victor Romanov, Kreuzwertheim (DE); Uwe Rothaug, Kreuzwertheim (DE)

(73) Assignee: adidas AG, Herzogenaurach (DE)

( * ) Notice: Subject to any disclaimer, the term of this patent is extended or adjusted under 35 U.S.C. 154(b) by 740 days.

(21) Appl. No.: 17/070,727

(22) Filed: Oct. 14, 2020

(65) Prior Publication Data
US 2021/0106096 A1  Apr. 15, 2021

(30) Foreign Application Priority Data

Oct. 15, 2019 (DE) .......................... 102019215874.9
Oct. 5, 2020 (EP) ..................................... 20200152

(51) Int. Cl.
*A43B 13/02* (2022.01)
*A43B 13/18* (2006.01)
(Continued)

(52) U.S. Cl.
CPC ............ *A43B 13/187* (2013.01); *A43B 13/02* (2013.01); *A63B 37/06* (2013.01);
(Continued)

(58) Field of Classification Search
CPC ... A43B 13/187; A43B 13/188; A43B 13/023; A43B 13/02; A43B 13/12; A43B 13/04; A43B 1/0063
(Continued)

(56) References Cited

U.S. PATENT DOCUMENTS 1,403,326 A   1/1922  Jacobsen
3,060,513 A  10/1962  Klink et al.
(Continued)

FOREIGN PATENT DOCUMENTS

CN   103974813   8/2014
CN   109463845   3/2019
(Continued)

OTHER PUBLICATIONS

German Patent Application No. 102019215874.9, Office Action, dated Jun. 4, 2020, 12 pages (English machine translation provided).
(Continued)

*Primary Examiner* — Marie D Bays
(74) *Attorney, Agent, or Firm* — Kilpatrick Townsend & Stockton LLP

(57) ABSTRACT

The present invention relates to a method for manufacturing a particle foam part, in particular a cushioning element for sportswear, such as a shoe sole, or a cushioning element, which has been produced by such a method, in particular a shoe sole. The method for manufacturing a cushioning element for sportswear such as a shoe sole, may comprise the steps of feeding foam particles into a mold cavity of a mold tool, and welding of the foam particles in the mold cavity while applying a predetermined pressure, wherein the foam particles comprise a fraction of at least 10% by weight
(Continued)

of recycled, shredded foam particles (regenerated material) and the welding of the foam particles is effected by means of electromagnetic waves.

19 Claims, 2 Drawing Sheets

(51) Int. Cl.
| | |
|---|---|
| *A63B 37/06* | (2006.01) |
| *B29C 35/08* | (2006.01) |
| *B29C 43/00* | (2006.01) |
| *B29C 43/02* | (2006.01) |
| *B29C 43/52* | (2006.01) |
| *B29K 105/00* | (2006.01) |
| *B29K 105/04* | (2006.01) |
| *B29K 105/26* | (2006.01) |
| *B29L 31/50* | (2006.01) |

(52) U.S. Cl.
CPC ........ *B29C 35/0805* (2013.01); *B29C 43/003* (2013.01); *B29C 43/02* (2013.01); *B29C 43/52* (2013.01); *A63B 2037/065* (2013.01); *B29C 2035/0861* (2013.01); *B29K 2105/04* (2013.01); *B29K 2105/251* (2013.01); *B29K 2105/26* (2013.01); *B29L 2031/504* (2013.01)

(58) Field of Classification Search
USPC .......................................... 36/25 R, 30 R, 31
See application file for complete search history.

(56) References Cited

U.S. PATENT DOCUMENTS

| | | | |
|---|---|---|---|
| 3,242,238 A | 3/1966 | Edberg et al. | |
| 5,128,073 A | 7/1992 | Allen et al. | |
| 9,185,947 B2 * | 11/2015 | Spencer | A43B 1/12 |
| 10,952,489 B2 * | 3/2021 | Kormann | B29B 17/02 |
| 2008/0060221 A1 * | 3/2008 | Hottinger | A43B 1/0063 |
| | | | 36/11.5 |
| 2009/0267264 A1 | 10/2009 | Tranter et al. | |
| 2010/0293814 A1 * | 11/2010 | Skaja | B29D 35/122 |
| | | | 428/206 |
| 2017/0072599 A1 | 3/2017 | Huang et al. | |
| 2018/0327564 A1 | 11/2018 | Baghdadi et al. | |
| 2019/0366666 A1 * | 12/2019 | Fakhouri | B29C 43/52 |

FOREIGN PATENT DOCUMENTS

| | | |
|---|---|---|
| DE | 102016100690 | 7/2017 |
| DE | 102017205830 | 10/2018 |
| EP | 0657266 | 6/1995 |
| EP | 1990170 | 11/2008 |
| JP | 06315993 | 11/1994 |
| JP | 0788876 | 4/1995 |
| JP | 10120029 | 5/1998 |
| JP | 2002265660 | 9/2002 |
| JP | 2005111246 | 4/2005 |
| JP | 2009538247 | 11/2009 |
| JP | 2014128414 | 7/2014 |
| JP | 2014531352 | 11/2014 |
| JP | 2015000907 | 1/2015 |
| JP | 2017061143 | 3/2017 |
| JP | 2019115704 | 7/2019 |
| WO | 2014128214 | 8/2014 |
| WO | 2018088551 | 5/2018 |
| WO | 2018100154 | 6/2018 |
| WO | 2019122122 | 6/2019 |

OTHER PUBLICATIONS

Chinese Application No. 202011102624.6, Office Action, dated Mar. 10, 2022, 26 pages (14 pages of Original Document and 12 pages of English Translation).
European Application No. 20200152.5, Office Action, dated May 10, 2022, 5 pages.
Office Action, German Patent Application No. 10 2019 215 874.9, dated Oct. 6, 2022, 11 pages.
Office Action, Chinese Patent Application No. 202011102624.6, dated Aug. 15, 2022, 21 pages.
Decision of Rejection, Chinese Patent Application No. 202011102624.6, dated Nov. 9, 2022, 20 pages.
Office Action, European Patent Application No. 20200152.5, dated Dec. 22, 2022, 5 pages.
European Patent Application No. 20200152.5, Extended European Search Report dated Feb. 12, 2021, 22 pages.
Japanese Application No. 2020173148, Office Action dated Oct. 26, 2021, 34 pages (English machine translation provided).
Japanese Application No. 2020173148, Office Action dated Feb. 8, 2022, 8 pages (English machine translation provided).
Office Action, Japanese Patent Application No. 2022-161583, dated Jun. 27, 2023, 13 pages.
Office Action, European Patent Application No. 20200152.5, dated Aug. 23, 2023, 5 pages.

* cited by examiner

METHOD OF MANUFACTURING A PARTICLE FOAM PART, ESPECIALLY A CUSHIONING ELEMENT FOR SPORTSWEAR OR SPORTING GOODS

CROSS REFERENCE TO RELATED APPLICATION

This application is related to and claims priority benefits from German Patent Application No. 102019215874.9, filed on Oct. 15, 2019 ("the '874 application"), and European Patent Application No. 20200152.5, filed on Oct. 5, 2020 (the '152 application"). Both applications are hereby incorporated herein in their entirety by this reference.

FIELD OF THE INVENTION

The present invention relates to a method for manufacturing a particle foam part.

BACKGROUND

A particularly preferred field of application of the present invention is the manufacture of a cushioning element for sportswear, such as a shoe sole or a midsole, or for sporting goods, such as a foam component for a sportive ball, in particular, for a football. The invention also comprises cushioning elements for sportswear, such as a shoe sole or a midsole, or, for sporting goods, such as a foam component for a sportive ball, in particular, for a football, which have been produced by a method according to the invention and/or on a manufacturing apparatus according to the invention.

Products made of plastic, such as particle foam parts, which are only used once, for example as packaging, are considered to be environmentally harmful. Such plastic parts are increasingly being replaced by parts made of other materials. There is therefore a considerable need to make particle foam parts more environmentally friendly. The environmental compatibility may be increased if a significant fraction of the material may be recycled. This applies regardless of whether the molded parts are only used once or are intended for long-term use, as is the case with shoe soles, for example.

For particle foam parts made of expanded thermoplastic polystyrene (ePS), there is already a recycling rate of up to 10%. This means that up to 10% of the raw material used to manufacture a particle foam part is recycled material.

Recycled particle foam parts are shredded and mixed with new material. In the following, recycled, shredded particle foam material is referred to as "regenerated material" and non-recycled foam particles are referred to as "original material". The term "original material" is thus used to refer to foam particles that have not yet been or have not been welded together to form a particle foam part—unless they have been melted down and extruded again, see below. The foam particles of the original material have a closed surface. They can also be filled with a blowing agent. When the material is heated, the air trapped in the material or the blowing agent contained in it expands so that the walls of adjacent foam particles press against each other when heated and may be welded together to form a particle foam part, for example a shoe sole, especially a midsole, or a foam component for a sportive ball, in particular for a football.

Recycled, shredded foam particles (regenerated material) usually do not have a closed surface. Therefore, they do not expand when heated. A low percentage of recycled, shredded particle foam parts may not, or not significantly, affect the production of a particle foam part, depending on its intended use.

At the latest, however, if the fraction of recycled material is to be increased, the necessary pressure is not present when welding the foam particles to the particle foam part, with which the foam particles must press against each other to enable uniform welding. With a regenerated material fraction of more than 10%, conventional production methods have the problem that the welding of the particles does not take place in certain areas, so that there are sections of the finished particle foam part which are not correctly welded. The foam particles then form loose crumbs in the particle foam part.

This is particularly disadvantageous in the case of particle foam parts, which, according to their intended use, should undergo a large number of load cycles and must also possess a certain stability, as is typically the case with soles for modern sports shoes or foam components for sportive balls. Possibly with such major disadvantages that the use of (considerable amounts of) regenerated material for the production of such shoe soles (or other cushioning elements for sportswear or sporting goods) using the known methods is completely ruled out.

To counteract this, internal tests have been carried out in which external pressure is applied to the foam particles so that they are pressed together to a sufficient degree. It has been shown that with a fraction of significantly more than 10% of recycled material, a pressure of about 5 bar is appropriate in order to achieve satisfactory welding. However, this has the disadvantage that the contact surface of the foam particles is inherently larger. As a result, steam introduced into a mold cavity to weld the foam particles (as is the case with so-called "steam-chest-molding") can no longer penetrate the edge of the mold cavity to a sufficient degree and may not penetrate sufficiently into the interior of the component. As a result, the foam particles are welded more strongly in the edge area than in the center of the component. This in turn leads to low quality particle foam parts due to poor welding in the center.

If one wants to increase the fraction of regenerated material, one can shred, press/melt and re-extrude particle foam parts that are basically to be recycled. This produces foam particles from recycled material and with a closed surface. In this way the problems explained above may be overcome. However, to re-extrude recycled material, additives may need to be added. These additives are expensive. There is also the risk that the foam particles produced in this way are contaminated and may be of inferior quality to foam particles produced from non-recycled material. Nevertheless, such particles can also be understood as original material in the sense of the present application and invention and may be used accordingly, if desired.

Methods and apparatuses for the production of particle foam parts from foam particles by means of saturated dry steam are described for example in WO 2014/128214 A1.

Methods and apparatuses for welding foam particles to particle foam parts with electromagnetic waves are for example described in U.S. Pat. Nos. 3,060,513, 3,242,238, GB 1403326, U.S. Pat. No. 5,128,073 and WO 2018/100154 A1.

Further prior art is known from WO 2019/122122 A1, DE 102017205830 A1, US 2018/0327564 A1 and DE 102016100690 A1.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some aspects, the disclosure relates to a method for producing a cushioning element for sportswear or for sporting goods, comprising: —feeding foam particles into a mold cavity of a mold, and —welding the foam particles in the mold cavity while applying a predetermined pressure, wherein the foam particles comprise at least 10% by weight of recycled, shredded foam particles and the foam particles are welded by electromagnetic waves. The foam particles may comprise at least 20% or at least 30% by weight of recycled, shredded foam particles. The electromagnetic radiation may be electromagnetic RF radiation which has a frequency of at least 30 KHz. The predetermined pressure in the mold cavity may be at least 2 bar, at least 3 bar, or at least 5 bar. The foam particles may be based on polystyrene (ePS), based on polypropylene (ePP), based on polyurethane (eTPU), based on polyether block amide (ePEBA), based on polylactate (PLA), based on polyamide (ePA), based on polybutylene terephthalate (ePBT), based on polyester ether elastomer (eTPEE) or based on polyethylene terephthalate (ePET). The method may further comprising adding a heat transfer medium to the foam particles during welding.

In some aspects, the present disclosure is directed to an apparatus for manufacturing a cushioning element for sportswear or for sporting goods. The apparatus may comprise: a mold that defines a mold cavity, means for applying a predetermined pressure to foam particles located in the mold cavity, a generator for generating electromagnetic waves for welding the foam particles in the mold cavity, and a mixing apparatus for mixing recycled, shredded foam particles and non-recycled and non-shredded foam particles and/or a shredding apparatus for shredding foam material to be recycled is provided The apparatus may be used to manufacture a cushioning element for sportswear or for sporting good as described in the above paragraph.

In some aspects, the present disclosure is directed to a cushioning element for sportswear or for sporting goods, such as a shoe, comprising foam particles welded together, wherein the foam particles comprise a fraction of at least 10% by weight of recycled, shredded foam particles. The cushioning element may comprise at least one section with the recycled, shredded foam particles. The cushioning element may comprise at least two sections having varying weight fractions of the recycled, shredded foam particles. The at least one section of the recycled, shredded foam particles may be arranged as at least one layer. The at least two layers with the recycled, shredded foam particles may have different thicknesses. The cushioning element may be for sportswear, and the recycled, shredded foam particles may be arranged in a forefoot portion and/or in a rearfoot portion of the cushioning element. The cushioning element may be for a sportive ball and the recycled, shredded foam particles may be arranged as a core of the sportive ball.

In some aspects, the present disclosure is directed to a method for manufacturing a cushioning element for a foam component for a sportive ball, as described in the paragraph above, using a method paragraph 16.

BRIEF DESCRIPTION OF THE DRAWINGS

In the following detailed description, embodiments of the invention are described referring to the following figures.

BRIEF DESCRIPTION

Figure 1:
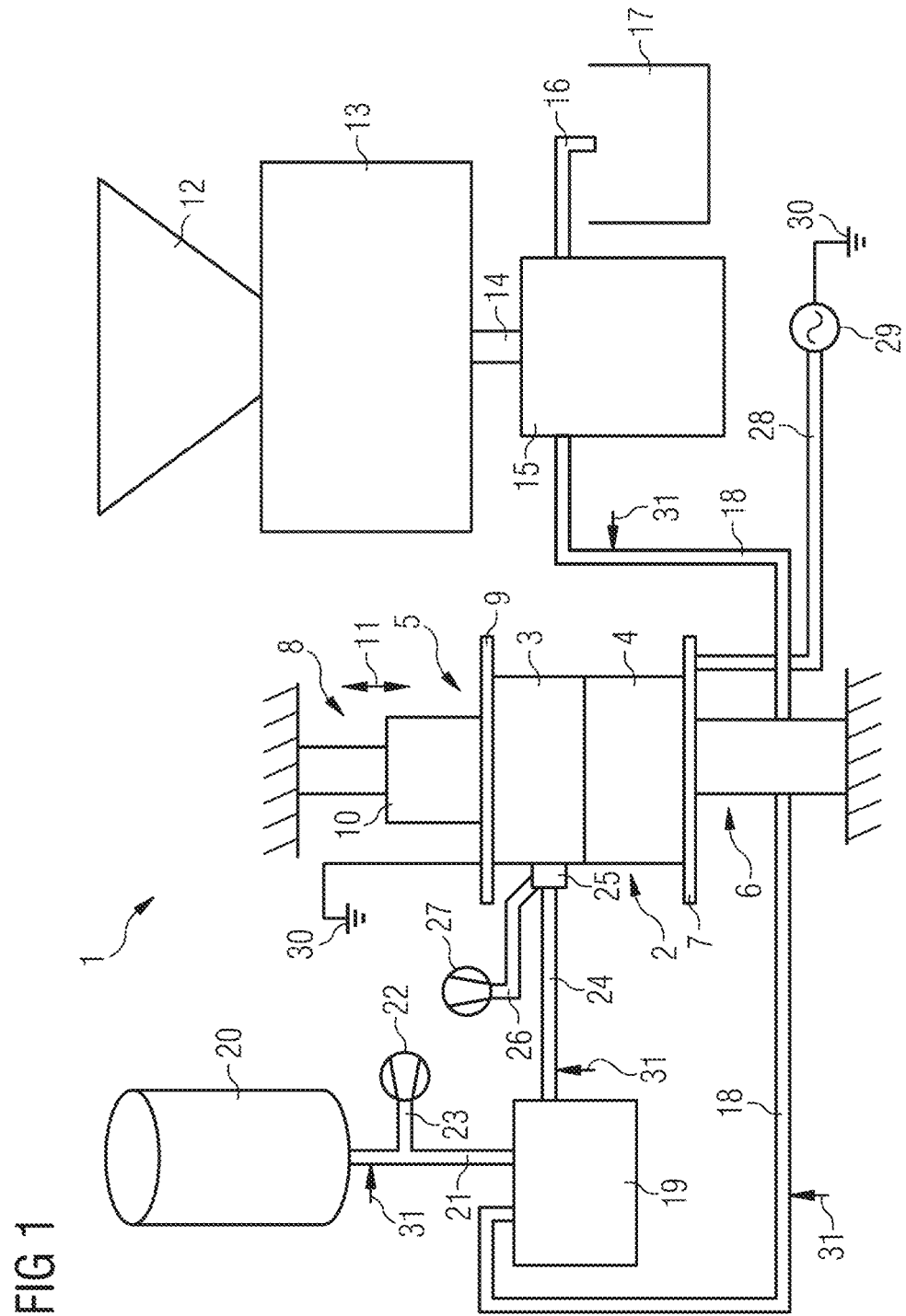
FIG. 1: an apparatus for manufacturing a particle foam part using recycled particle foam material in a block diagram.

The present invention is based on the object of creating a method and an apparatus with which foam particles with a high fraction of regenerated material may be welded simply and reliably in high quality.

A particular object is to provide such a method and such an apparatus especially for the use in the production of cushioning elements for sportswear, especially shoe soles, or sporting goods, especially a foam component for a sportive ball, in particular for a football. The object is solved by the independent claims. Desirable embodiments are indicated in the respective dependent claims.

A method according to the invention for manufacturing a particle foam part, in particular a cushioning element for sportswear, such as a shoe sole or a midsole, or for sporting goods, such as a foam component for a sportive ball, in particular for a football, comprises the steps of feeding foam particles into a mold cavity of a mold tool, and welding of the foam particles in the mold cavity while applying a predetermined pressure, wherein the foam particles comprise a fraction of at least 10% by weight of recycled, shredded foam particles (regenerated material) and the welding of the foam particles is effected by means of electromagnetic waves.

In some embodiments, particles that are obtained by shredding particle foam parts can comprise several individual foam particles (sometimes also called "beads" or "pellets"), which are originally welded together and are still closed after shredding. In some embodiments, these particles may be shredded to such an extent that the original, individual foam particles (beads or pellets) are separated. This usually damages the surface of the individual foam particles so that such strongly shredded particles may be the above-mentioned "regenerated material" having no closed surface.

The inventors of the present invention have recognized that when welding the foam particles by means of electromagnetic waves, any pressure may be applied to the foam particles without affecting the welding of the foam particles, since the electromagnetic waves penetrate the foam particles completely and heat them from the inside. Depending on the quality, size and fraction of the regenerated material, the pressure may be adjusted accordingly so that there is sufficient contact between adjacent foam particles in the mold cavity. In addition, the use of electromagnetic waves as an energy source also makes it possible to produce molded parts with complex three-dimensional geometry and, in particular, areas of varying thickness, which makes the method particularly suitable for the production of shoe soles and, in particular, midsoles of sports shoes (or other cushioning elements for sportswear with complex geometry).

The regenerated material, i.e. the recycled, shredded foam particles, may be obtained in particular by shredding old molded parts, e.g. by shredding old shoe soles or mid-soles or old sporting goods such as foam components of sportive balls in which the particles were already bonded together. This may be a particularly simple and cost-effective way of recovering the regenerated material, as such whole parts are easy to handle.

On the other hand, however, it is also possible within the scope of the present invention to recover the regenerated material from old particles which had not yet been bonded together to form a molded part (e.g. in order to recycle stock surpluses of old material and not to have to dispose of them).

It is also mentioned once again that, in principle, particles with a closed surface that have been re-extruded from melted down recycled material can also be used as original material.

Experiments carried out by the applicant have shown that there is hardly any loss of quality when welding particle foam parts made of ePS up to a fraction of approximately 60% by weight of recycled, shredded foam particles (regenerated material). This is very surprising, since a considerable problem is solved in a very simple way.

Polystyrene hardly absorbs any electromagnetic waves. Therefore, when welding foam particles of ePS using electromagnetic waves, a heat transfer medium such as water is added to absorb the electromagnetic waves. This causes the foam material to be heated indirectly by the electromagnetic waves. When the fraction of regenerated material was 70% or more, the particle foam parts contained a high level of unwanted residual moisture.

In the case of materials such as expanded thermoplastic polyurethane (eTPU), which is particularly suitable for the production of shoe soles or sportive ball, in particular for a football, and which absorbs electromagnetic waves better than polystyrene, it is not absolutely necessary to add a heat transfer agent for welding. With these materials the problem of residual moisture does not exist, so that even particle foam parts with a fraction of more than 70% regenerated material may be reliably produced with high quality.

The fraction of recycled, shredded foam particles may be at least 20% by weight and in particular at least 30% by weight or at least 50% by weight or at least 70% by weight.

The predetermined pressure in the mold cavity is, in some embodiments, at least 2 bar, in particular at least 3 bar, and can also be set to at least 5 bar. The higher the pressure, the higher the fraction of recycled, shredded foam particles may be set and/or the more the recycled material may be shredded.

On the other hand, the set pressure also influences the mechanical properties of the molded part produced, e.g. the stiffness of the shoe sole, so that more or less regenerated material (corresponding to a higher or lower pressure) may be used here depending on the desired properties.

The electromagnetic waves are, in some embodiments, electromagnetic RF radiation. The electromagnetic RF radiation, in some embodiments, has a frequency of at least 30 KHz or at least 0.1 MHz, in particular at least 1 MHz or at least 2 MHz and preferably at least 10 MHz.

The electromagnetic RF radiation, in some embodiments, has a maximum frequency of 300 MHz.

The generator for generating electromagnetic waves, in some embodiments, generates electromagnetic waves with an amplitude of at least 10$^3$ V and in particular at least 10$^4$ V. Commercially available generators produce RF radiation with a frequency of 27.12 MHz.

The electromagnetic waves can also be microwaves.

The foam particles may be based on ePS (expandable polystyrene) or ePP (expandable polypropylene). These two materials absorb electromagnetic radiation only to a small extent. It is therefore advisable to add a dielectric heat transfer medium, such as water, when welding.

The foam particles can also be formed from other expanded thermoplastics, especially those that absorb electromagnetic waves well.

Foam particles based on expanded polyurethane (ePU), extruded polyether block amide (ePEBA), expanded polylactate (PLA), expanded polyamide (ePA), expanded polybutylene terephthalate (ePBT), expanded polyester ether elastomer (eTPEE) or expanded polyethylene terephthalate (ePET) can also be used. Such materials absorb electromagnetic waves well, so foam particles of these materials may be welded together using electromagnetic waves without the addition of a heat transfer medium. This is especially true for the use of RF radiation, which allows mold cavities up to a few meters in size to be uniformly irradiated with electromagnetic waves.

The materials which absorb electromagnetic radiation, especially RF radiation, well, each have a functional group (here: amide group, urethane group or ester group) which effect a dipole moment. These functional groups are responsible for the molecules absorbing the electromagnetic radiation. Therefore, other thermoplastics that have such functional groups that effect a dipole moment are also suitable for welding with electromagnetic radiation, especially RF radiation.

The recycled, shredded foam particles may be mixed with non-shredded foam particles in a predetermined ratio using a mixing apparatus and fed to the mold. By means of such a method, the fraction of recycled, shredded foam particles may be freely adjusted and quickly varied.

In addition, recycled particle foam material may be shredded and then fed into the mold cavity.

Another aspect of the invention relates to an apparatus for producing a particle foam part, in particular a cushioning element for sportswear or for sporting goods, such as a foam component for a sportive ball, in particular for a football, comprising a mold that defines a mold cavity, means for applying a predetermined pressure to foam particles in the mold cavity, and a generator for generating electromagnetic waves to weld the foam particles in the mold cavity.

This apparatus is characterized in that a mixing apparatus for mixing recycled, shredded foam particles and non-recycled and non-shredded foam particles and/or a shredding apparatus for shredding foam material to be recycled is provided.

By providing the mixing apparatus it is possible to feed individual ratios of recycled, shredded foam particles (=regenerated material) and non-recycled and non-shredded foam particles (=original material) to the mold and to vary these ratios quickly. The shredding apparatus allows the feeding of particle foam parts to be recycled, which are shredded to a size of foam particles suitable for rewelding. In particular, the shredding apparatus may be adjusted in such a way that foam particles of a predetermined size may be produced specifically by shredding.

The size of the shredded particles produced in this way can even be used desirably to influence the mechanical properties of the molded part produced, e.g. a shoe sole or a sportive ball, in particular, for a football, already during shredding. For example, shredding to smaller diameters can increase the stiffness of the molded part compared to shredding to larger diameters.

The apparatus for applying a predetermined pressure to foam particles in the mold cavity may be a press which presses a mold consisting of two mold halves together to create the pressure in the mold cavity. However, this apparatus may also include a pump which conveys carrier gas with which the foam particles are transported into the mold cavity and thereby sets the mold cavity under a predetermined pressure. When filling the mold cavity with foam particles, a desired pressure is thus set.

The method described above may be designed in such a way that the described apparatus is used for this purpose.

Since, as already mentioned several times, a particularly important field of application of the present invention is the production of a cushioning element for sportswear and in particular the production of a shoe sole (e.g. a midsole or an insole) or a cushioning element for sporting goods, such as a foam component for a sportive ball, in particular, for a football, this will be dealt with in more detail in the following:

An important aspect of the present invention thus comprises a method for manufacturing a cushioning element for sportswear, in particular a shoe sole or a midsole, or for sporting goods, such as a foam component for a sportive ball, in particular, for a football, comprising the steps feeding of foam particles into a mold cavity of a mold, welding of the foam particles in the mold cavity while applying a predetermined pressure, wherein the foam particles comprise at least 10% by weight of recycled, shredded foam particles and the welding of the foam particles is performed by means of electromagnetic waves.

One possibility is that the whole cushioning element is made of the foam particles including the recycled, shredded foam particles. However, it is also possible that other non-particulate materials are used. In this case the weight % refers to the particulate materials used.

It is also mentioned once again that the recycled, shredded foam particles are obtained by shredding old molded parts, e.g. by shredding old shoe soles or midsoles or old foam components from sportive balls in which the particles were already bonded together, but that it is also possible to obtain the regenerated material by shredding old particles that were not yet bonded together to form a molded part. In any case, the (average) size of the shredded regenerated material can serve as a further adjusting means to influence the mechanical properties of the produced cushioning element.

On the other hand, particles with a closed surface that have been re-extruded from melted down recycled material can also be used as original material.

Furthermore, the fraction of recycled, shredded foam particles (i.e. regenerated material) may be at least 20% by weight and in particular at least 30% by weight and at least 50% by weight and at least 70% by weight respectively. In this case, the predetermined pressure in the mold cavity may be at least 2 bar, in particular at least 3 bar and, in some embodiments, at least 5 bar. As mentioned above, the pressure to be used can increase with increasing amounts of regenerated material, but other factors such as the desired mechanical properties of the manufactured product also influence the choice of a suitable pressure.

The foam particles can also be used in a cushioning element for sportswear or for sporting goods, such as a foam component for a sportive ball, in particular, for a football, based on polystyrene (ePS), based on polypropylene (ePP), based on polyurethane (eTPU), based on polyether block amide (ePEBA), based on polylactate (PLA), based on polyamide (ePA), based on polybutylene terephthalate (ePBT), based on polyester ether elastomer (eTPEE) or based on polyethylene terephthalate (ePET).

Especially good for the use in cushioning elements, especially shoe soles or footballs, may be foam particles containing or consisting of eTPU, ePA, ePEBA and/or eTPEE, due to the mechanical properties these materials can provide for cushioning elements made of them.

It is possible to combine shredded particles of one material with non-shredded particles of another material, provided that joint processing, especially welding with the aid of electromagnetic waves, is possible.

A beat transfer medium may be added to the foam particles during welding using electromagnetic waves. The heat transfer medium may be a liquid, such as water, for example. A metal can also be used.

By adding such means, the degree of welding may be influenced and controlled, even locally, which in turn can allow influencing the mechanical properties of the manufactured product.

However, the foam particles can also be welded by means of electromagnetic waves without the addition of a heat transfer medium, provided that this already allows a sufficient degree of welding. This possibility has the advantage that it is particularly simple from a process engineering point of view.

In the method of manufacturing a cushioning element for sportswear or for sporting goods, a mixing apparatus may be used in which recycled, shredded foam particles and non-shredded foam particles are mixed in a predetermined ratio and fed to the mold. For example, recycled particle foam material—e.g. in the form of old shoe soles or the like or foam components from sportive balls, for example, ball panels from old footballs—may be shredded and then fed into the mold cavity.

Furthermore, the present invention comprises an apparatus for manufacturing a cushioning element for sportswear, in particular a shoe sole or a midsole, or for sporting goods, such as a foam component for a sportive ball, in particular for a football, from foam particles, wherein apparatus comprises a mold that defines a mold cavity, an apparatus for applying a predetermined pressure to foam particles in the mold cavity, and a generator to generate electromagnetic waves to weld the foam particles in the mold cavity, characterized in that, a mixing apparatus for mixing recycled, shredded foam particles and non-shredded foam particles and/or a shredding apparatus for shredding foam material to be recycled is provided.

The apparatus for manufacturing a cushioning element may further include a sorting apparatus for sorting shredded foam particles.

On such an apparatus, a method as described above may be carried out to produce a cushioning element for sportswear, in particular a sole for a shoe or a midsole, or for sporting goods, such as a foam component for a sportive ball, in particular, for a football. The various design options of the method according to the invention may be combined with each other as far as technically possible.

A further aspect of the present invention relates to a cushioning element for sportswear, in particular a sole for a shoe or a midsole, or for sporting goods, such as a foam component for a sportive ball, in particular, for a football, comprising foam particles welded together, wherein the foam particles comprise a fraction of at least 10% by weight of recycled, shredded foam particles.

In some embodiments, the cushioning element for sportswear, in particular a sole for a shoe or a midsole, may comprise at least one section of material comprising the recycled, shredded foam particles. The at least one section may be comprised entirely of the recycled, shredded foam particles. The at least one section may be comprised of recycled, shredded foam particles in varying weight fractions. As mentioned previously, the fraction of recycled, shredded foam particles within the section may be at least 10% by weight, 20% by weight and in particular at least 30% by weight and at least 50% by weight or at least 70% by weight. The recycled, shredded foam particles may be combined with the above-mentioned original material of non-recycled foam particles. The recycled, shredded foam particles may be combined with another compatible polymer material.

The at least one section of the recycled, shredded foam particles may comprise the entire shoe sole. The at least one section of the recycled, shredded foam particles may comprise the entire midsole. The at least one section of the recycled, shredded foam particles may be arranged at specific locations within the shoe sole, or midsole. The at least one section of the recycled, shredded foam particles may be arranged in a forefoot portion and/or in a rearfoot portion of the cushioning element for sportswear, in particular a sole for a shoe or a midsole. The at least one section of the recycled, shredded foam particles may be arranged in a medial region and/or in a lateral region of the shoe sole, or a midsole. The at least one section of the recycled, shredded foam particles may be arranged in a combination of the above locations.

Furthermore, the at least one section of the recycled, shredded foam particles may be arranged as at least one layer. The shoe sole, or midsole, may comprise a single layer. The shoe sole, or midsole, may comprise two or more layers. A layer may be entirely comprised of a single section of the recycled, shredded foam particles. A layer may comprise multiple sections of the recycled, shredded foam particles.

For example, pre-manufactured layers with at least one section of the recycled, shredded foam particles may be used to manufacture the finished sole with a sandwich structure of layers in a cost-efficient manner.

At least two layers may comprise different thicknesses. For example in case of a sports shoe, a sole may comprise a different thickness with the recycled, shredded foam particles in a forefoot portion compared to the rest of the sole so that the mechanical properties like cushioning or stiffness of this sole portion may be selectively adjusted.

In some embodiments, the sections of the cushioning element comprise substantially the same properties. In some embodiments, the sections of the cushioning element may differ from each other by at least one property, for example, energy return, shear stability or stiffness, color, hardness, thickness, density. In some embodiments, different layers may comprise different fractions of the recycled, shredded foam particles to provide a high degree of design flexibility for a wearer. Alternatively, or additionally, in some embodiments, different types of shredded, recycled foam particles are used, for example, shredded eTPU in one section and shredded ePEBA in another section. In some embodiments, mixtures of shredded, recycled foam particles may be used. As previously mentioned, the fraction of the shredded, recycled foam particles may be adjusted to tailor the desired final properties to the required performance of the cushioning element.

Such arrangements of the recycled, shredded foam particles also follow the above-mentioned ideas to provide a high degree of design flexibility and allow to selectively adjust the mechanical properties due to the specific needs of a wearer in certain areas of the sole. For example, a running shoe should provide a good mix of stability and cushioning properties to avoid pronation or supination.

In some embodiments, the cushioning element for sporting goods, such as a foam component for a sportive ball, in particular, for a football, may comprise at least one section of material comprising the recycled, shredded foam particles. The at least one section may be comprised entirely of the recycled, shredded foam particles. The at least one section may be comprised of recycled, shredded foam particles in varying weight fractions. As mentioned previously, the fraction of recycled, shredded foam particles within the section may be at least 10% by weight, 20% by weight and in particular at least 30% by weight and at least 50% by weight or at least 70% by weight. The recycled, shredded foam particles may be combined with the above-mentioned original material of non-recycled foam particles. The recycled, shredded foam particles may be combined with another compatible polymer material.

The at least one section of the recycled, shredded foam particles may be arranged as a panel for a sportive ball. The at least one section of the recycled, shredded foam particles may comprise the entire panel for a sportive ball. The at least one section of the recycled, shredded foam particles may be arranged as a section of a panel for a sportive ball. The panel may further comprise a protective coating for the recycled, shredded foam particles, for example, a polyurethane (PU) spray coating or a foil coating, for example, PU foil.

The at least one section of the recycled, shredded foam particles may comprise the entire foam component or the entire sportive ball. The at least one section of the recycled, shredded foam particles may comprise the entire football. The at least one section of the recycled, shredded foam particles may be arranged at specific locations within the foam component for the sportive ball, in particular, for the football. The at least one section of the recycled, shredded foam particles may be arranged in an essentially regular pattern at specific locations on the foam component for the sportive ball, in particular, for the football. An irregular or randomly arranged pattern is also possible.

Furthermore, the at least one section of the recycled, shredded foam particles may be arranged as at least one layer. The foam component for the sportive ball, in particular, for the football, may comprise a single layer. The foam component for the sportive ball, in particular, for the football, may comprise two or more layers. A layer may be entirely comprised of a single section of the recycled, shredded foam particles. A layer may comprise multiple sections of the recycled, shredded foam particles. At least two layers may comprise different thicknesses.

For example, pre-manufactured layers with at least one section of the recycled, shredded foam particles may be used to manufacture the finished foam component for the sportive ball, in particular, for the football, with a sandwich structure of layers in a cost-efficient manner.

In some embodiments, the sections of the cushioning element comprise substantially the same properties. In some embodiments, the sections of the cushioning element may differ from each other by at least one property, for example, energy return, shear stability or stiffness, color, hardness, thickness, density. In some embodiments, different layers may comprise different fractions of the recycled, shredded foam particles to provide a high degree of design flexibility for athletics. Alternatively, or additionally, in some embodiments, different types of shredded, recycled foam particles are used, for example, shredded eTPU in one section and shredded ePEBA in another section. In some embodiments, mixtures of shredded, recycled foam particles may be used. As previously mentioned, the fraction of the shredded, recycled foam particles may be adjusted to tailor the desired final properties to the required performance of the cushioning element for sporting goods.

A further aspect of the present invention relates to a method for manufacturing a cushioning element for a foam component for a sportive ball, in particular, for a football, comprising at least one of the above-mentioned steps, wherein the football has no bladder and comprises of the shredded, recycled foam particles. The shredded, recycled, foam particles may be arranged as a core of the football. Alternatively, or additionally, in some embodiments, the football comprises layers of the shredded, recycled foam particles for improved weight reduction. The layers may be interspersed with layers of different shredded material or layers on non-shredded material, for example, lightweight foam such as EVA.

In particular, the foam particles (i.e. the recycled, shredded and non-shredded ones) may contain or consist of eTPU, ePA, eTPEE and/or ePEBA. In principle, shredded particles of one material can also be combined with non-shredded particles of another material, provided that joint processing is possible.

The foam particles may have been welded by applying a predetermined pressure and using electromagnetic waves.

In general, for the manufacture of such a cushioning element, the above described optional embodiment options of the method according to the invention may be combined with each other as far as technically possible, depending on the intended property profile of the cushioning element.

DETAILED DESCRIPTION

The invention is explained below by means of an example of an apparatus for the production of particle foam parts (FIG. 1). Such apparatuses are also referred to as automatic molding machine 1.

As already mentioned, such an apparatus and a method performed on it may be used in particular for the production of a cushioning element (FIG. 2) for sportswear or for sporting goods, such as a foam component for a sportive ball, in particular, for a football, and here the design options already described in detail above may be combined with each other as freely as possible (i.e. as far as technically possible) depending on the objective.

The automatic molding machine 1 of FIG. 1 comprises at least one mold 2, which is formed by an upper mold half 3 and a lower mold half 4. The mold 2 defines a mold cavity (not shown, e.g. in the form of a shoe sole 210) for receiving foam particles which are welded together in the mold cavity to form a particle foam part by the addition of heat.

The mold 2 is a so-called crack gap mold, i.e. it is designed in such a way that the two mold halves 3, 4 may be moved apart a little to take up foam particles and then, when filled, are pressed together by a press 5 to pressurize the foam particles in the mold cavity.

The press 5 comprises a press table 6 with a support plate 7 and a press plunger 8 with a press plate 9. The press plunger 8 has a cylinder/piston unit 10 with which the press plate may be raised and lowered (double arrow 11).

Furthermore, a container 12 is provided to hold particle foam parts to be recycled. The container 12 opens with its funnel-shaped and downwardly open underside into a shredding apparatus 13, which is designed for shredding particle foam parts, which are shredded into foam particles with a predetermined size range. The shredded foam particles are unevenly shaped by the shredding method. The maximum expansion of these foam particles is usually in the range of at least 3 mm, especially at least 4 mm and up to a maximum of 10 mm or 8 mm. The (average) size of the shredded foam particles may be controlled, for example, by adjusting the distance between two shredding rollers.

The shredding apparatus 13 is connected to a sorting apparatus 15 via a line 14. Sorting apparatuses for sorting foam particles are described, for example, in DE 10 2019 215 878.1. This patent application is incorporated by reference herein in its entirety. With the sorting apparatus 15 the shredded foam particles may be sorted according to predetermined criteria. At least one sorting criteria may be applied. Foam particles which do not meet the desired criteria are discharged via a discharge line 16 into a collecting container 17.

The sorting apparatus 15 is connected with a line 18 to a mixing apparatus 19. Via line 18 the recycled, shredded foam particles, which meet the sorting criteria, are transported from the sorting apparatus 15 to the mixing apparatus 19. These foam particles form a regenerated material.

The mixing apparatus is connected to a storage tank 20 via a line 21.

In lines 14, 18 the foam particles are transported by a carrier gas. The carrier gas is usually air. This carrier gas may be pressurized with a pump 22. The pump 22 is connected to line 21 via a branch line 23.

The storage container 20 is used to provide non-recycled foam particles. These are referred to as original material. The original material is fed via line 21 to the mixing apparatus 19.

At mixing apparatus 19, the regenerated material and the original material are mixed together in a certain ratio. The mixing ratio is freely adjustable.

The mixing apparatus 19 is connected by a line 24 to a filling injector 25, which opens at one of the two mold halves 3. In this example, the filling injector 25 opens at the upper half of the mold 3.

The filling injector is connected via a compressed air line 26 to a further pump 27, with which pressurized air may be supplied to the filling injector 25. This air is called filling air, with which the foam particles are conveyed from the filling injector 25 into the mold cavity of mold 2 and, if necessary, pressurized.

The support plate 7 is electrically conductive. It is, in some embodiments, a metal plate. It may be made of steel or aluminum, for example. The support plate 7 is connected to a high-frequency generator 29 via a coaxial line 28.

The high-frequency generator is designed to generate RF radiation. The high-frequency generator is connected to an electrical ground 30.

The press plate 9 is also electrically conductive. It can also be a metal plate, especially an aluminum or steel plate, which is connected to the electrical ground.

The support plate 7 and the press plate 9 thus form capacitor plates between which a high-frequency field or RF radiation may be applied with the high-frequency generator 29.

The two mold halves 3, 4 are made of a material that is essentially transparent to RF radiation. This material is for example polytetrafluoroethylene (PTFE), polyethylene, especially UHMWPE, polyetherketone (PEEK).

With this automated molding machine 1, the following method may be carried out, e.g. for the production of a cushioning element for sportswear, in particular a shoe sole (e.g. a midsole or inner sole), or a cushioning element for sporting goods, such as a foam component for a sportive ball, in particular, for a football:

Particle foam parts to be recycled are placed in the container 12, from which they are transferred to the shredder 13. In the shredder 13 they are shredded into foam particles. The foam particles are shredded into a predetermined size, which is adjustable. This regenerated material is fed to the sorting apparatus 15. With the sorting apparatus 15 impurities or foam particles, which do not correspond to predetermined criteria, are sorted out. These criteria may be of various kinds, such as size, shape, color, density. Magnetic particles can also be filtered out.

The regenerated material prepared in this way is fed via line 18 to the mixing apparatus 19, where the regenerated material may be mixed with the original material in a predetermined ratio. The mixing ratio itself may be set as desired. The fraction of the original material can also be 0%.

The foam particles are fed from the mixing apparatus 19 to the mold 2. Here the carrier gas is pressurized by means of pumps 22, 27, so that the foam particles are fed under pressure to the mold cavity.

During the feeding of the foam particles, the two mold halves 3, 4 are pulled apart a little. After the mold cavity is filled with foam particles, the two mold halves 3, 4 are pressed together a little bit by means of the press 5, thus reducing the size of the mold cavity and increasing the pressure on the foam particles in the mold cavity.

RF radiation is applied to the pressurized foam particles with the high-frequency generator 29 so that the foam particles are heated and welded together.

RF radiation heats the foam particles in the mold cavity and is heated from the inside out, either by directly absorbing the RF radiation or by adding a heat transfer medium, such as water, which absorbs the RF radiation and transfers it to the foam particles.

It is not necessary to supply steam to the mold 2 from the outside to weld the foam particles. The pressurization of the foam particles in the mold cavity in no way affects the heat supply by means of electromagnetic radiation.

The combination of electromagnetic radiation and the application of pressure to the foam particles in the mold cavity thus allows the welding of foam particles with a high fraction of regenerated material. Examples are explained in more detail below.

Within the scope of the invention, the above-mentioned example may be modified in various ways. For example, it is sufficient to provide only a pump or a press to apply pressure. It is not necessary that the foam particles are filled with a pump under pressure and then the mold is compressed by the press. However, the combination of pressure filling with a pump and compressing the crack gap with a press allows high pressure to be applied in the mold cavity.

In the context of the invention, it is also not necessary that the mold halves are transparent to the electromagnetic waves. The mold halves can also be made of metal and can themselves function as capacitor plates. If both mold halves are electrically conductive, they must be insulated from each other.

Optionally, a nozzle 31 may be provided at least one point of the lines 18, 21 and 24 to supply water or another fluid. The water may be supplied as liquid or steam.

The addition of the fluid may be provided on the one hand to facilitate the transport of the foam particles in the line. Such foam particles tend to clump together. If they are wetted on the surface with a liquid, such as water, this tendency decreases, and pumping is more reliable. Furthermore, such a fluid can serve as a heat transfer medium when welding the foam particles. Certain plastic materials, such as polystyrene (ePS) and polypropylene (ePP) only absorb electromagnetic radiation to a very low degree. The heat transfer medium can absorb the electromagnetic radiation in the mold cavity and transmit it to the foam particles. If materials are used which inherently absorb electromagnetic radiation well, it is not necessary to add a heat transfer medium.

Examples

Plates with dimensions 1000×500×60 mm (=30 liters) were produced. Both the original material and the regenerated material were foam particles of ePS. During filling, the mold was opened by a crack gap of 9 mm. The expanded volume of the mold cavity was 34.5 liters.

The foam particles were put under pressure when the mold halves were brought together.

Plates were produced with a percentage of regenerated material of 0%, 10%, 20%, 30%, 40%, 40%, 50%, 60%, 70%, 80%, 90% and 100%.

Water was added as heat transfer medium. The amount of water was between 150 ml and 250 ml. The higher the fraction of regenerated material, the higher the amount of water added.

All plates could be welded. Sheets with a regenerated material content of 70% and more had a rougher surface and contained much more residual moisture, which remained in the open-pored foam particles of the regenerated material.

Plates with up to 60% regenerated material met all quality requirements and are hardly distinguishable from plates without regenerated material.

Figure 2:
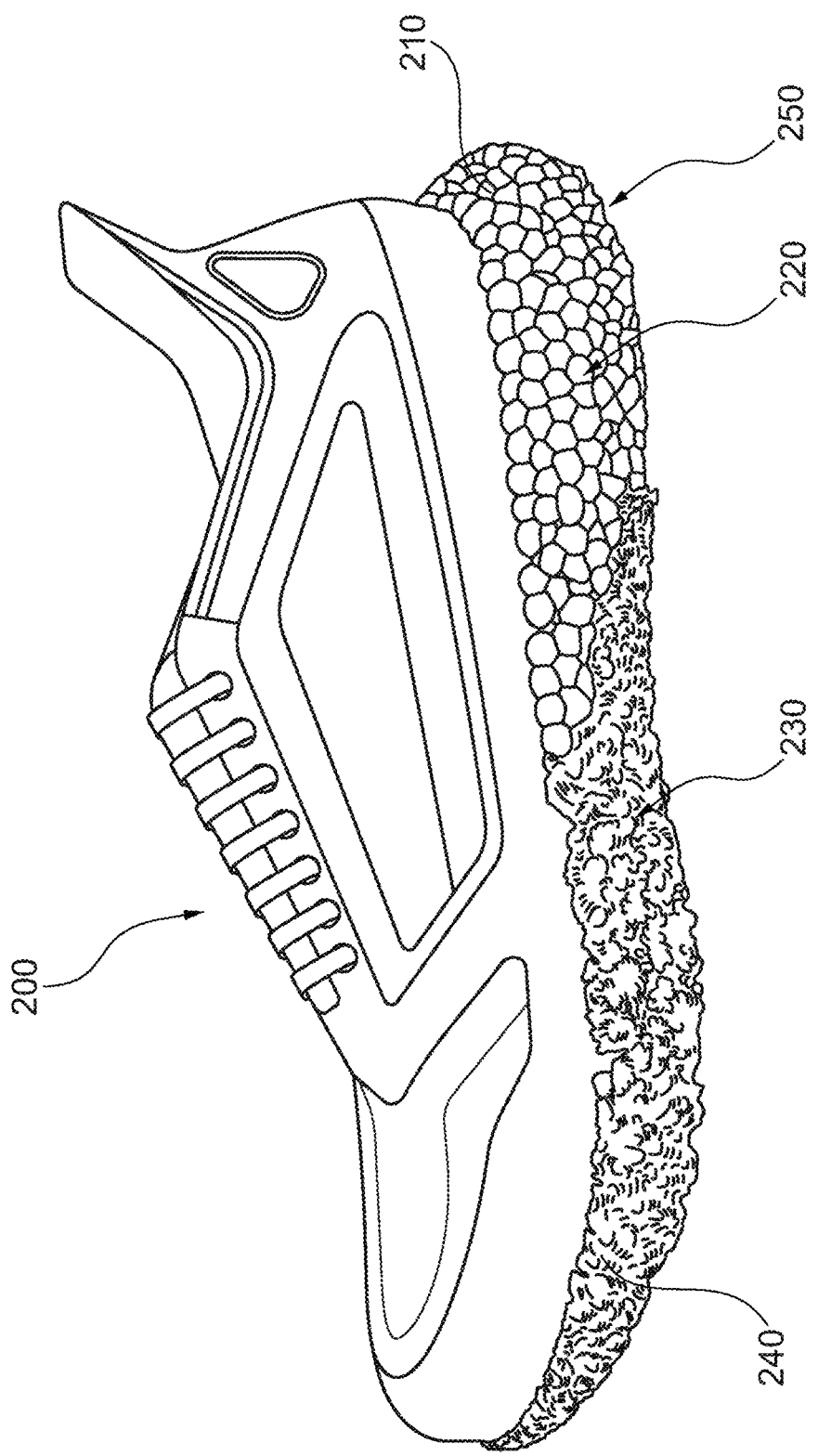
FIG. 2: exemplary embodiments of a cushioning element of a sole for a shoe or a midsole according to the present invention.

FIG. 2 presents exemplary embodiments of a shoe 200 having a sole 210 or a midsole as cushioning element according to the present invention. The sole 210 of the shoe 200 comprises foam particles 220 welded together, wherein the foam particles comprise a fraction of at least 10% by weight of recycled, shredded foam particles 230. In the embodiments of FIG. 2, the fraction of recycled, shredded foam particles 230 is approximately at least 40% by weight of the sole 210.

The sole 210 comprises at least one section of the recycled, shredded foam particles 230 arranged in at least one layer. A first section is arranged in a forefoot portion 240 of the sole 210, a second section is arranged in a midfoot portion of the sole 210 and a third section (not shown) is arranged in a heel or rearfoot portion 250 of the sole 210. A corresponding first layer extends in an upper part of the sole 210 from the forefoot portion 240 until the midfoot portion. A second layer extends in a lower part of the sole 210 from the forefoot portion 240 of the sole 210 close to the beginning of the heel or rearfoot portion 250 of the sole 210. A third layer (not shown) may extend on the lower surface of the sole 210 from the forefoot portion 240 of the sole 210 until the heel or rearfoot portion 250. In other words, over the entire lower surface of the sole 210. The skilled person will understand that these three sections and layers are only exemplary and other sections and layer arrangements are also disclosed in some embodiments.

Further exemplary embodiments of the present invention are described in the following list, which serves the further understanding of the possibilities provided by the invention:

1. A method for producing a particle foam part comprising the steps of: feeding of foam particles into a mold cavity of a mold, welding of the foam particles in the mold cavity while applying a predetermined pressure, wherein the foam particles comprise at least 10% by weight of recycled, shredded foam particles and the welding of the foam particles is performed by means of electromagnetic waves.

2. The method according to example 1, characterized in that
the fraction of recycled, shredded foam particles is at least 20% by weight and in particular at least 30% by weight or at least 50% by weight or at least 70% by weight.

3. The method according to example 1 or 2, characterized in that
the predetermined pressure in the mold cavity is at least 2 bar, in particular at least 3 bar and, in some embodiments, at least 5 bar.

4. The method according to one of the examples 1 to 3, characterized in that the foam particles are based on polystyrene (ePS), based on polypropylene (ePP), based on polyurethane (eTPU), based on polyether block amide (ePEBA), based on polylactate (PLA), based on polyamide (ePA), based on polybutylene terephthalate (ePBT), based on polyester-ether elastomer (eTPEE) or based on polyethylene terephthalate (ePET).

5. The method according to one of the examples 1 to 4, characterized in that a heat transfer medium is added to the foam particles during welding using electromagnetic waves.

6. The method according to example 5, characterized in that the heat transfer medium is a liquid, such as water.

7. The method according to one of the examples 1 to 4, characterized in that the foam particles are welded together using electromagnetic waves without the addition of a heat transfer medium.

8. The method according to one of the examples 1 to 7, characterized in that recycled, shredded foam particles and non-recycled and non-shredded foam particles are mixed in a predetermined ratio by means of a mixing apparatus and fed to the mold.

9. The method according to one of the examples 1 to 8, characterized in
that recycled particle foam material is shredded and then fed into the mold cavity.

10. An apparatus for producing a particle foam part, comprising:—a mold that defines a mold cavity, —means for applying a predetermined pressure to foam particles in the mold cavity, and —a generator for generating electromagnetic waves to weld the foam particles in the mold cavity, characterized in that a mixing apparatus for mixing recycled, shredded foam particles and non-recycled and non-shredded foam particles and/or a shredding apparatus for shredding foam material to be recycled is provided.

11. The apparatus for the production of a particle foam part according to example 10, characterized in that a sorting apparatus for sorting shredded foam particles is provided.

12. The method according to one of the examples 1 to 9, characterized in that
an apparatus according to example 10 or 11 is used.

13. A cushioning element for sportswear, in particular a sole for a shoe or a midsole, comprising foam particles welded together, wherein the foam particles comprise a fraction of at least 10% by weight of recycled, shredded foam particles.

14. A cushioning element according to example 13, wherein the foam particles contain or consist of eTPU, ePA, eTPEE and/or ePEBA.

15. The cushioning element according to example 13 or 14, wherein the foam particles have been welded by applying a predetermined pressure and using electromagnetic waves.

16. The cushioning element according to one of examples 13-15, manufactured using a method according to one of examples 1-9.

17. A shoe, especially sports shoe, with a sole or a midsole according to one of examples 13-16.

It is emphasized once more at this point that a particularly important aspect of the present invention lies in the manufacture of a cushioning element for sportswear, in particular in the manufacture of a shoe sole, and that all features and design options mentioned in the above list of exemplary embodiments can therefore be applied in the context of the manufacture of such a cushioning element for sportswear, individually and/or in various combinations and sub-combinations.

LIST OF REFERENCE SIGNS

1 Automatic molding machine
2 Mold
3 Upper mold half
4 Lower mold half
5 Press
6 Press table
7 Support plate
8 Press plunger
9 Press plate
10 Cylinder/piston unit
11 Double arrow
12 Container
13 Shredding apparatus
14 Line
15 Sorting apparatus
16 Discharge line
17 Collecting container
18 Line
19 Mixing apparatus
20 Storage tank
21 Line
22 Pump
23 Branch line
24 Line
25 Filling injector
26 Pressure vessels
27 Pump
28 Coaxial line
29 High-frequency generator
30 Electrical ground
31 Nozzle The above list of reference signs is an integral part of the present application.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for producing a cushioning element for sportswear or for sporting goods, comprising:
    feeding foam particles into a mold cavity of a mold, and
    welding the foam particles in the mold cavity while applying a predetermined pressure,
    wherein the foam particles comprise at least 10% by weight of recycled, shredded foam particles and a fraction of original particles, wherein the recycled, shredded foam particles do not have a closed surface and wherein the original particles have a closed surface; wherein the foam particles are welded by electromagnetic waves.

2. The method according to claim 1, wherein the foam particles comprise at least 20% by weight of recycled, shredded foam particles.

3. The method according to claim 1, wherein the foam particles comprise at least 30% by weight of recycled, shredded foam particles.

4. The method according to claim 1, wherein the electromagnetic radiation is electromagnetic RF radiation which has a frequency of at least 30 KHz.

5. The method according to claim 1, wherein the predetermined pressure in the mold cavity is at least 2 bar.

6. The method according to claim 1, wherein the predetermined pressure in the mold cavity is at least 3 bar.

7. The method according to claim 1, wherein the predetermined pressure in the mold cavity is at least 5 bar.

8. The method according to claim 1, wherein the foam particles are based on polystyrene (ePS), based on polypropylene (ePP), based on polyurethane (eTPU), based on polyether block amide (ePEBA), based on polylactate (PLA), based on polyamide (ePA), based on polybutylene terephthalate (ePBT), based on polyester ether elastomer (eTPEE) or based on polyethylene terephthalate (ePET).

9. The method according to claim 1, further comprising adding a heat transfer medium to the foam particles during welding.

10. An apparatus for manufacturing a cushioning element for sportswear or for sporting goods, using a method according to claim 1, the apparatus comprising:
    a mold that defines a mold cavity,
    means for applying a predetermined pressure to foam particles located in the mold cavity,
    a generator for generating electromagnetic waves for welding the foam particles in the mold cavity, and
    a mixing apparatus for mixing recycled, shredded foam particles and non-recycled and non-shredded foam particles and/or a shredding apparatus for shredding foam material to be recycled is provided.

11. A cushioning element for sportswear or for sporting goods, comprising foam particles welded together, wherein the foam particles comprise a fraction of at least 10% by weight of recycled, shredded foam particles and a fraction of original particles, wherein the recycled, shredded foam particles do not have a closed surface and wherein the original particles have a closed surface.

12. The cushioning element according to claim 11, comprising at least one section with the recycled, shredded foam particles.

13. The cushioning element according to claim 11, comprising at least two sections having varying weight fractions of the recycled, shredded foam particles.

14. The cushioning element according to claim 11, wherein the at least one section of the recycled, shredded foam particles is arranged as at least one layer.

15. The cushioning element according to claim 14, wherein at least two layers with the recycled, shredded foam particles have different thicknesses.

16. The cushioning element according to claim 11, wherein the cushioning element is for sportswear, and wherein the recycled, shredded foam particles are arranged in a forefoot portion and/or in a rearfoot portion of the cushioning element.

17. The cushioning element according to claim 12, wherein the cushioning element is for a sportive ball and wherein the recycled, shredded foam particles are arranged as a core of the sportive ball.

18. A shoe with a cushioning element for sportswear according to claim 11.

19. A method for manufacturing a cushioning element for a foam component for a sportive ball, according to claim 11, using a method according to claim 1.

* * * * *